United States Patent
Gredegard et al.

(10) Patent No.: US 9,866,772 B2
(45) Date of Patent: Jan. 9, 2018

(54) METHOD FOR PROCESSING A VIDEO STREAM

(71) Applicant: Axis AB, Lund (SE)

(72) Inventors: Henning Gredegard, Lund (SE); Bjorn Ardo, Lund (SE); Dawid Studzinski, Sopot (PL)

(73) Assignee: Axis AB, Lund (SE)

( * ) Notice: Subject to any disclaimer, the term of this patent is extended or adjusted under 35 U.S.C. 154(b) by 6 days.

(21) Appl. No.: 14/968,117

(22) Filed: Dec. 14, 2015

(65) Prior Publication Data
US 2016/0182838 A1    Jun. 23, 2016

(30) Foreign Application Priority Data
Dec. 19, 2014  (EP) .................................... 14199154

(51) Int. Cl.
*H04N 5/232* (2006.01)
*H04N 5/262* (2006.01)
(Continued)

(52) U.S. Cl.
CPC .......... *H04N 5/357* (2013.01); *G06T 3/0018* (2013.01); *G06T 5/006* (2013.01); *H04N 5/217* (2013.01);
(Continued)

(58) Field of Classification Search
None
See application file for complete search history.

(56) References Cited

U.S. PATENT DOCUMENTS

| 5,784,526 A * | 7/1998 | Shimoda ............ H04N 5/78263 348/474 |
| 2004/0017491 A1 | 1/2004 | Stavely |

(Continued)

FOREIGN PATENT DOCUMENTS

| CN | 1830002 A | 9/2006 |
| CN | 101742125 A | 6/2010 |

(Continued)

OTHER PUBLICATIONS

Extended European Search Report dated Mar. 23, 2015 in European Application 14199154.7, filed on Dec. 19, 2014 (with Written Opinion).

(Continued)

*Primary Examiner* — Mark T Monk
(74) *Attorney, Agent, or Firm* — Oblon, McClelland, Maier & Neustadt, L.L.P.

(57) ABSTRACT

A method for correcting and presenting a barrel distorted image is disclosed. In the method an output image is created having a user-defined aspect ratio (AR), and the method comprises acquiring a continuous flow of barrel distorted images in a video camera and processing the image in an image processing unit. The processed image is added as an output image to an image stream, and the actual processing includes applying a barrel distortion correction so as to form a corrected image having a smallest width (w') and a smallest height (h'), and generating the output image by cropping the corrected image to a height exceeding or equaling the smallest height (h') and having the user-defined aspect ratio (AR).

13 Claims, 3 Drawing Sheets

(51) Int. Cl.
  *H04N 5/77* (2006.01)
  *G06T 3/00* (2006.01)
  *G06T 5/00* (2006.01)
  *H04N 5/357* (2011.01)
  *H04N 5/217* (2011.01)

(52) U.S. Cl.
  CPC ....... *H04N 5/23296* (2013.01); *H04N 5/2628* (2013.01); *H04N 5/3572* (2013.01); *H04N 5/772* (2013.01)

(56) References Cited

U.S. PATENT DOCUMENTS

| | | | |
|---|---|---|---|
| 2005/0093891 A1* | 5/2005 | Cooper | G03B 17/18 345/649 |
| 2007/0188633 A1 | 8/2007 | Mandy et al. | |
| 2010/0091381 A1* | 4/2010 | Katakura | G02B 13/001 359/676 |
| 2010/0119172 A1* | 5/2010 | Yu | G06T 5/006 382/256 |
| 2013/0222649 A1* | 8/2013 | Hattori | G06T 11/00 348/240.2 |

FOREIGN PATENT DOCUMENTS

| | | |
|---|---|---|
| CN | 104041055 A | 9/2014 |
| CN | 104103067 A | 10/2014 |
| CN | 104115491 A | 10/2014 |

OTHER PUBLICATIONS

"How to Correct Go Pro Fisheye in After Effects Without Cropping", https://www.youtube.com/watch?v=stmzNSCRI_M, Mar. 4, 2014 (submitting selected screenshots, 2 pages)

Chinese Office Action and Search Report dated Sep. 6, 2017 in Chinese Application No. 201510925434.7 (6 pages).

* cited by examiner

METHOD FOR PROCESSING A VIDEO STREAM

TECHNICAL FIELD

The present invention relates to processing a stream of images in a video application, in particular a stream in which the images are affected by varying zoom settings for a video camera in a situation where the images are affected by geometric distortions.

BACKGROUND

A common type of geometric distortion in an imaging system including a zoom lens is barrel distortion. Barrel distortion manifests itself in that the magnification decreases with distance from the optical axis, and as such barrel distortion is categorized as a radial distortion. Another type of radial distortion is pincushion distortion and moustache distortion, and in many imaging systems a combination of these three geometric distortions may coexist although the effect of one or two may be negligible in relation to a third. For the purposes and application of the present invention barrel distortion would be the prominent one. The effect of barrel distortion may be that a rectangular object with four straight edges as imaged will obtain a barrel-like shape where the edges are convex, hence the name.

Depending on the zoom settings the geometric distortion may be more or less pronounced, and the general tendency is that the effects are reduced as the degree of zoom is increased, yet the distortion will also depend on other parameters, such as focus.

In some applications the effect of barrel distortion is acceptable or even wanted, yet in other applications post-processing of the affected images is used. Most image post-processing software includes a barrel distortion correction function in which a user may alter various parameters for reducing the effects of barrel distortion in images acquired.

When applying barrel distortion correction to a video stream the use of trial and error is less applicable, in particular if zoom optics are utilized. The solution is instead to map the imaging optics such that the correction function to be applied is known for each zoom setting of the optics (the lens, the set of lenses, etc.). The correction function may be a polynomial representing the level of distortion of an image as a function of radius (i.e. distance from the optical axis). The polynomial may be obtained by the approximation of the distortion curve, characteristic to the specific focal length of the optic lens. Having the information, how the optic's characteristic look like for different values of the focal lengths, it is possible to calculate the set of polynomial coefficients for each possible zoom position. This set of coefficients may be stored as constant values, and subsequently the calculations are applied when a zoom setting is changed. Consequently the image processing unit may be provided with updated data concerning the zoom settings. After a mapping of the imaging optics the only input needed for a correction to be performed is thus the current zoom settings for the imaging optics. In an imaging processing module of the camera the pixels are rearranged in accordance with the mapping previously performed, or according to a theoretical approach. In the above and below zoom has been used to define imaging optics having variable focal length settings, normally including varifocal lens systems and parfocal lens systems to mention two common types.

SUMMARY OF THE INVENTION

With the purpose of providing an improvement in relation to distortion correction the present disclosure relates to a method for correcting and presenting a barrel distorted image with a user-defined aspect ratio. The method comprises acquiring a continuous flow of barrel distorted images in a video camera and processing the image data in an image processing unit within the camera and adding the processed image data as an output image to an image stream, and the processing includes applying a barrel-distortion correction so as enable formation of a corrected image having a minimum width and a minimum height. As a last step an output image is formed by cropping the corrected image to a height exceeding or equaling the minimum height and having the user-defined aspect ratio.

It will be described in the detailed description as well, yet it may be worthwhile mentioning that neither the corrected image nor the output image are formed as real images in the camera, and they exist only as image information or image data. This is obvious for the skilled person, yet to avoid an overly literal interpretation of the claims it may as well be highlighted. Maintaining the aspect ratio when forming the output image in the camera (still referring to image data rather than to a real image) will prevent a disruption of the video stream. By enabling for a height exceeding the minimum height (as defined herein) reduces the amount of information lost, or at least increases the field of view since more of the width information will be maintained as well.

In one or several embodiments the height of the output image exceeds the minimum height to some extent, and in further embodiments areas of the output image extending beyond the minimum height may be masked. In this way the same aspect ratio may be maintained while a minimum height may alter for reasons to be described in the detailed description.

In still other or related embodiments the output image is cropped to a width smaller than or equal to the minimum width, while having the user-defined aspect ratio, and in one particular location in the above interval the corrected image may be is cropped to a width equaling the minimum width.

The above features may be particularly beneficial if a zoom setting of the camera alters, since such alteration will affect the amount of barrel distortion and therefore the properties of the corrected image. In a specific embodiment, which may be combined with other embodiments the image processing may be performed continuously for each zoom setting as the zoom settings are varied.

According to another inventive concept the method further comprises enablement of a user interaction where a user input may be utilized, wherein the user may define a format of the output image freely within the constraints given previously, i.e. that the width is smaller than or equal to the minimum width and the height is larger than the minimum height, while maintaining the user-defined aspect ratio.

The invention according to any embodiment thereof may beneficially be performed in an image processing unit of a video camera. This also enables a live feed during performance of the method and a minimum effort on a receiver end.

In one or more embodiments the barrel distortion correction may be based on input of a current zoom setting of the camera, such that a particular zoom setting refer to a particular correction function to be applied in the barrel distortion correction.

In any embodiment a functionality for a user to select a view comprising an output image corresponding to an image displayed without barrel-distortion correction or an output image displayed with barrel-distortion correction, while the same user-defined aspect ratio is used.

In any of the above embodiments the barrel-distortion correction may be based on a current zoom setting for the camera. The current zoom setting may be acquired from a control unit of the camera, and by using the zoom setting, transformation data may be acquired for said current settings.

The method may also, in one or more embodiments, enable the receipt of a client request including a selection between an output image displayed without barrel distortion correction or an output image corrected for barrel distortion, wherein the same client-defined aspect ratio is used for any output image stream.

DETAILED DESCRIPTION OF EMBODIMENTS

Figure 1:
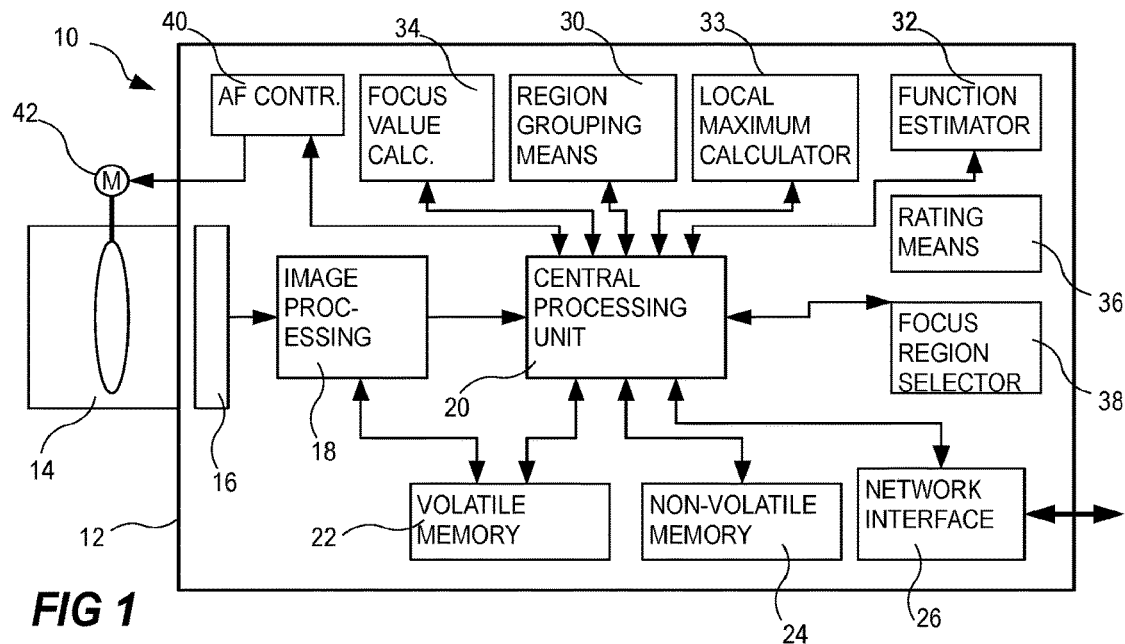
FIG. 1 is a block diagram for a video camera of a kind that may be used in embodiments for the present invention.

A camera 10 arranged to perform one embodiment of the invention is shown in FIG. 1. The camera 10 includes a housing 12, a lens 14, an image sensor 16 for registering an image of a camera view, an image processing unit 18 for initial image processing, a central processing unit 20 for general control and for execution of program code, a volatile memory 22 for temporary storage of information, a non-volatile memory 24 for persistent storage of information, and a network interface 26 for receiving and/or transmitting instructions, information, and image data, over a network. Moreover, the central processing unit 20 is arranged to implement a region grouping means 30, a function estimator 32, means for calculating a local focus maximum from a function 33, a focus value calculator 34, a rating means 36 for rating of regions, a focus region selector 38 for selecting a region based on the rating, and an autofocus controller 40. These functionalities may be implemented by the central processing unit 20 by means of arranging program code that when executed performs the functionality of these devices. Further, the skilled person appreciates that the functionality of these devices also may be implemented using logic circuitry or other hardware configurations.

Figure 2:
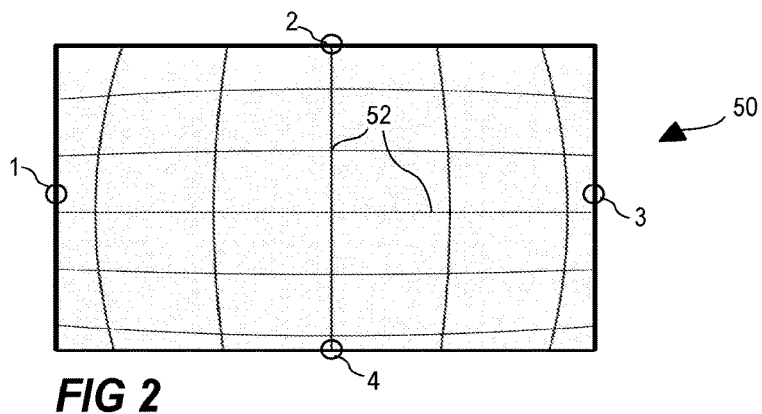
FIG. 2 is a representation of an image formed and read from an image sensor.

FIGS. 2-6 illustrate a typical scenario for an application of the present invention, according to one embodiment thereof. FIG. 2 illustrates an outline of a first image 50 as imaged onto the image sensor. What is imaged onto the sensor represents the imaged scene, including the distortions generated by e.g. barrel distortion introduced by the imaging optics. The outline of the image will be rectangular since it of course will follow the shape of the sensor, while the image as such will include all distortions. The shape may vary with the shape of the sensor, but may also differ from rectangular if the lens and sensor are matched in such a way that the image does not cover the full sensor surface, in which case one may choose only to extract information from the exposed area of the image sensor.

The effect of the distortions is exemplified by an imaged grid 52 which originally involves rectangular shapes that after distortion caused by the imaging optics transforms into the distinctive barrel shape giving name to the distortion. This is meant to illustrate how the shape may alter in a distortion and then be corrected in a transformation operation.

A user will define or at least select a capture mode, including e.g. the desired resolution, aspect ratio, frame rate etc., such as "1920×1080 at 60 fps". For the purposes of the present description only the aspect ratio AR will be considered, and the aspect ratio is communicated to the camera via a client, and though typical aspect ratios are 16:9 (as the example above) or 4:3, other or basically any aspect ratio may be used.

The image sensor data is read from the image sensor and processed into raw image data, and the processing may include e.g. calibration, demosaicing, sharpening, scaling, transforming, etc., and in a typical case the raw image has the dimensions of the sensor, a width w and a height h. In the present disclosure the width is considered to exceed the height, since this is a conventional way of acquiring and presenting visual information such as video. The camera or imaging device could of course be inclined 90 degrees, yet in such an embodiment the width would refer to the vertical direction, i.e. the larger dimension in an imaging application. In a video application images are read out from the image sensor at a certain rate, such as 60 frames per second (fps), and are processed in an image processing unit of the camera before forwarding a processed video stream from the camera to auxiliary equipment. During processing the user-defined capture mode is used as input such that the processed stream obtains the correct format, including the correct aspect ratio. Changing capture mode results—in many cases—in that the image stream needs to be restarted, and since this in turn results in a temporary stop in the image stream such an action is generally not desired. In this context it is relevant to note that an actual image will be formed on the image sensor and subsequently on a display if it is to be shown to a user. Between the image sensor and the display there is no actual image but rather image information or image data, and therefore the discussion related to length and width should be understood from a pictorial viewpoint rather than a literal viewpoint. When transforming the acquired image so as to remove the effects of barrel distortion use may be made of a database, preferably containing information stored in the camera. Barrel distortion will depend on the zoom settings and therefore a database or transformation table for barrel-distortion correction may use a current value of the zoom settings as input. The output will be a transformation function determining how the information from the image sensor should be rearranged in order for an image true to reality is to be displayed. The transformation function may also be used to maintain user-defined selections (masks) during a zooming process as well as handling other distortions. If there are no distortions, or if a user prefers not applying any distortion correction the processed video stream may be forwarded as is, or at least without barrel distortion correction. It is quite common to allow for a user to choose to observe the entire distorted image, since in most distortion correction some information may be lost or altered. Information may not be lost in the distortion correction as such, yet when adapting the distortion corrected image cropping of the image is commonly used to adapt the corrected shape to a shape suitable for display and/or for aesthetic reasons. In some applications a camera view is arranged such that an area of interest is located near or in the optical axis, and the peripheral information from near the boundaries of the image may be less important. In other embodiments, e.g. when a camera is one camera in a set of cameras used to monitor a parking lot, the information found near the boundaries of the image may be more relevant.

Returning to FIG. 2, the imaged scene would be affected by distortions, the predominant for the present case being barrel distortion. For that reason a barrel distortion correction may be conducted during processing of the acquired image.

In such an embodiment a transformation table may be used, which may be an actual table but in the present case it may also be a polynomial function. The transformation table uses as input data regarding the characteristics of the imaging optics used, i.e. present focal length settings and more particularly data regarding distortions etc., and its purpose is to move image information (e.g. pixel intensity information) from the imaged position on the image sensor to the position in which it should have been without distortions. Notably, despite the purpose, the transformation may not necessarily eliminate every effect of distortion completely. In other embodiments the transformation table may merely be a table comprising information concerning the shift to be performed for each pixel, wherein the polynomial function may be used to update the table for a new zoom setting. In this way the calculation is performed one time for each zoom setting rather than one time for each image.

Figure 3:
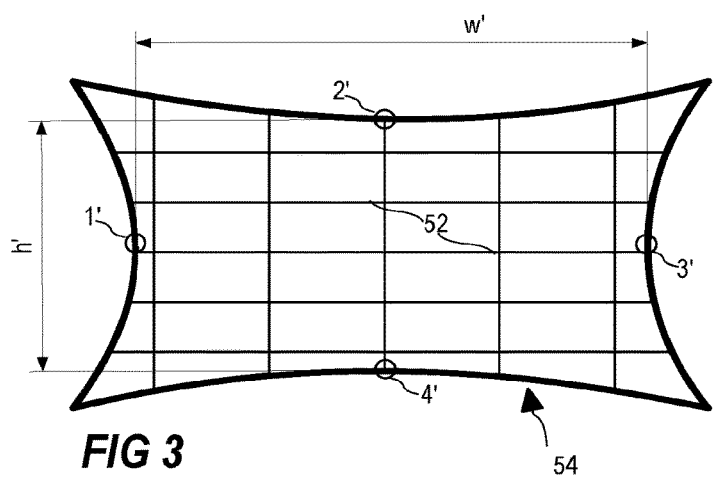
FIG. 3 is a representation of the image of FIG. 2 after a barrel correction has been applied.

An image according to FIG. 2 may in the present example correspond to the real image formed on the image sensor of the camera. FIG. 3 illustrates the corrected image data in the form of a corrected image 54. While the imaged grid 52 now is closer to the appearance of the imaged object the outline of the image is no longer rectangular. As mentioned before, in barrel distortion the magnification is a function of a radial distance from an optical center, meaning that the outline as such will be transformed as exemplified in FIG. 3, i.e. there will be more spatial information available the greater the distance from the optical axis. The correction may preferably be performed in the image processing unit of the camera in the way briefly discussed already. It may not be evident from the drawings alone, yet due to the properties of barrel distortion and its dependence on distance from the optical axis the application of a barrel-distortion correction may alter the aspect ratio of the corrected image as compared to the aspect ratio prior to barrel-distortion correction. For a quadratic view it may not have any effect, yet for an uncorrected rectangular view there will be a transformation to an even more elongate corrected view. If the four corners of the pillow shape are used for defining the outer boundaries of the corrected image the relation between length and width (i.e. the aspect ratio) will change. The minimum height of the corrected image may be referred to as h' and the minimum width may be referred to as w' (see FIG. 3).

In this context it is worth mentioning that the corrected image formed, may actually never be formed as such, at least not as an image. There is a real image formed on the image sensor, and later there may be a real image formed on an image display. Between those two nodes however, all that exists is image data enabling the formation of an image.

In cases where barrel distortion is the major contributor to the distortion of the image may display a symmetry and the minimum width will correspond to a waist in the lateral direction while the minimum height will correspond to a waist in the vertical direction. It is preferred to maintain a user-defined aspect ratio in the transmitted video stream in order not to cause an interruption, as previously mentioned. Therefore, if the distortion-correction alters the aspect ratio, there may be a need to decide which portions of the image to transmit, i.e. how to rescale and/or crop the corrected image.

A common solution used is to crop the corrected image to the particular aspect ratio used such that the video stream may continue uninterrupted when a user switches between viewing an uncorrected view and a view in which distortion correction is applied, i.e. adapting the distortion corrected view to the selected capture mode having the user-defined aspect ratio.

Figure 4:
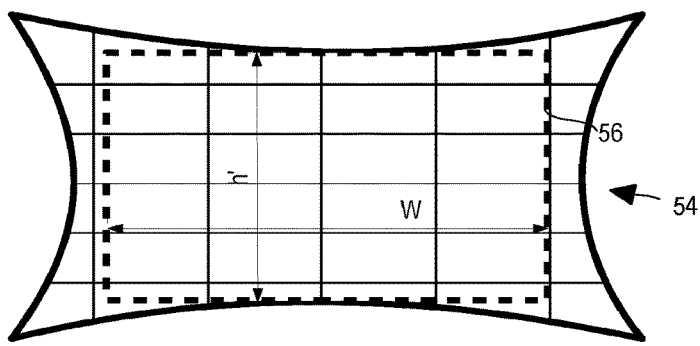
FIG. 4 is a view illustrating how an area is cropped from the corrected image of FIG. 3.

FIG. 4 illustrates a common way of cropping the corrected image to form an output image. A rectangular area 56 having the user-defined aspect ratio is fitted to show the largest amount of information within the boundaries of the corrected image, resulting in a rectangular shape having the height h' and a width W. Only the information inside the rectangle 56 will be shown to the operator, and it is evident that some information along the outermost lateral edges of the image 54 will be lost in the cropping procedure, i.e. all information outside of the width W, and some information near the corners of the image 54. This may be referred to as "height-limited cropping".

Since barrel distortion has a dependence on the distance from the optical axis, the effects of barrel distortion would be reduced if the user were to zoom in on a detail in the scene, and the discrepancy between a corrected view and a distorted view would decrease.

Figure 5:
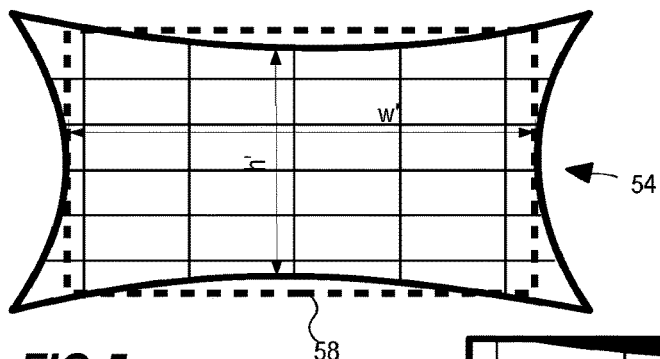
FIG. 5 is a view illustrates the image of FIG. 3 cropped differently from FIG. 4.

Another alternative, which is one of the embodiments of the present invention, is presented in FIG. 5. In this embodiment the distortion corrected image 54 is cropped to the minimum width, with the intent to maintain the same aspect ratio in the transmitted image. Consequently a rectangular shape 58 having the same aspect ratio would be fitted to the minimum width w' of the corrected image 54, which may be referred to as "width-limited cropping". The result would be that the rectangle 58 would extend beyond the boundaries of the corrected image 54 along portions of the upper and lower edges thereof, which is also shown in FIG. 5. If forwarded as such, in a video stream, the cropped view of the output image 60 shown to an operator or user would be similar to that of FIG. 6. Convex areas 62 bulging in from the top and bottom would be "empty" in regard of image information.

In order to deduce the position of the lateral and vertical waists of the corrected image use may be made of the previously mentioned transformation table. For symmetry reasons the position of the center points on each side of the distorted (uncorrected) image may be used as input, and by applying the transformation table on these coordinates the coordinates of the waist positions are identified, see the coordinates 1, 2, 3, and 4 in FIG. 2, and their transformed positions 1', 2', 3' and 4' in FIG. 3. In a reference system where the original raw image has the height h and the width w and in which the coordinate (0,0) is found in one of the corners of the image the waist positions used as input may be (0,h/2), (w,h/2), (w/2,0) and (w/2,h) respectively. The stated coordinates is a common way to define positions in the image and when working with image data. Often the uppermost left pixel position is set as (0,0). In this respect a translation is performed in the following. In the claim language of the present application, and the corresponding description the (0,0) is instead set as representing the optical axis, i.e. the center of the distortion corrected image. In such a coordinate system the waists positions to be used as input would be (−w/2,0), (w/2,0), (0, −h/2), and (0, h/2), i.e. full symmetry around the optical axis, which simplifies the description of the embodiments. In the practical case there may not be much of a calculation since the transformation tables may give the coordinates for each waist directly without any further arithmetics.

Figure 6:
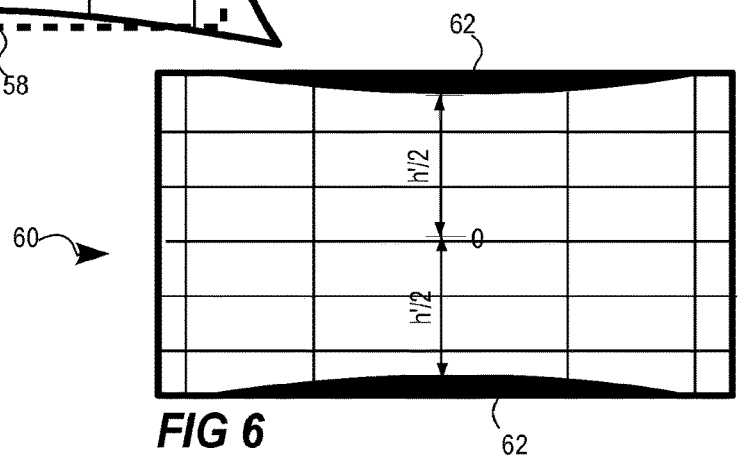
FIG. 6 is the image resulting from the cropping procedure of FIG. 5.
Figure 7:
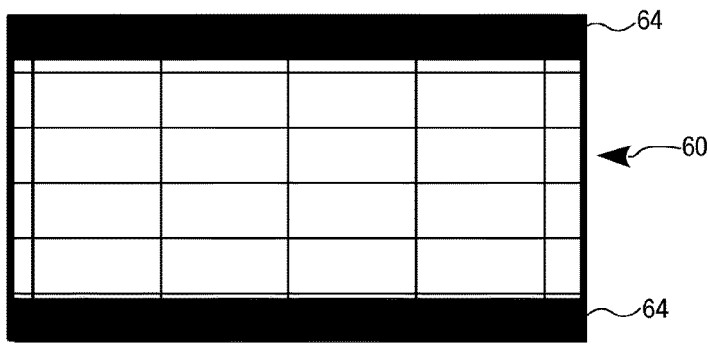
FIG. 7 is the image of FIG. 6, with a mask applied.

In one further embodiment, shown in FIG. 7, of the present invention a mask 64 is applied to areas of the image 60, so as to hide the bulging areas. Using the optical axis as a definition of a center of the image the location of the masks may be defined. In all essence the areas extending beyond +/−h'/2 in a vertical direction will be masked in the corrected and cropped image (see the image of FIG. 6 for reference) resulting in a view corresponding to the image of FIG. 7. In a practical situation the vertical components of the coordinates 2' and 4' are used as input. It may be noted that the position of these coordinates, at least the vertical component therefor will vary if the degree of barrel distortion varies. For each focal-length setting there will be a different transformation and therefore the position of the coordinates will change continuously during a change in the zoom settings (as the focal length changes and the effect of barrel distortion varies with the focal length).

By comparing FIG. 6 and FIG. 7 it may be observed that in effect the application of the masks 64 may hide small portions of the imaged scene, i.e. the portions in the corners of the image which will be covered by the mask 64. Still, for a user the masked view may appear as having a more familiar format which may cause less distraction. Furthermore, less information needs to be transmitted and still a user will not find the reduction too noticeable since along a vertical centerline no information is lost.

Figure 8:
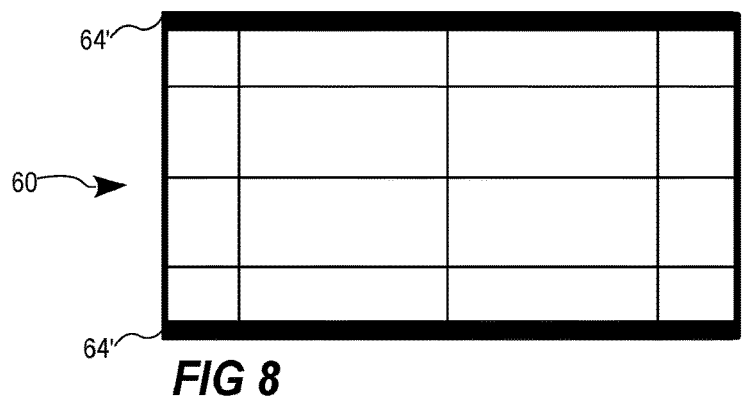
FIG. 8 is a representation of an image having been processed like the image of FIG. 7, yet under different circumstances.

The mere application of a mask to an image may be more or less known, yet there is a benefit in performing the distortion correction, the cropping and the masking on a live video stream, preferably in the image processing unit of a camera before transmitting the information. By performing the image transformation in the camera rather than in a remote client less information needs to be transmitted and the quality of the video stream will be less dependent on the computing capacity on the client end. In particular this transformation may be performed for any and every zoom setting, and since the barrel distortion will be reduced with increased zoom the size of the masked areas will be reduced with increased zoom. In another embodiment of the present invention therefore the mask applied is arranged to follow the transformation of the corrected image during a zooming operation. The condition stated earlier in regard of the extension of the mask will still be true, yet as an effect of the reduced effects of the distortion of the acquired image the actual extension of the masked areas will be reduced, as indicated in the view of FIG. 8, where the increased mesh size of the imaged grid is meant to indicate the increased zoom applied. The extension of the masks 64' is now reduced to a fraction of the original extension 64. The very same algorithms may be used regardless of zoom settings (focal length settings), and the transformation table accounts for continuously supplying the present settings.

When the imaging optics is zoomed to the max, i.e. to the maximum focal length settings the masked areas may have disappeared completely or almost completely, and the information found in the distortion corrected image is close to the information found in the distorted raw image. In this way a user may see essentially the full width of the imaged scene while still having reduced the visual appearance of artifacts generated by distortions.

In still another embodiment a user may select if "width-limited cropping" or "height-limited cropping" is to be used. The user may also be given the opportunity to select something between these two extremes, whereby a user-defined width and a user-defined height may be set, still ensuring that the aspect ratio is maintained. The selection as such may be performed in a user interface, e.g. by ticking a box or by moving a slider between the two extremes, and the maintained aspect ratio will enable a continuous variation. In this way the user may optimize the view on width or height or something there between. This makes it possible for a user to adjust the displayed view to the scene to the greatest possible extent; is there information near the lateral edges that may be interesting, or is the maximum resolution in a vertical direction more important.

Again, the appearance and choice of words throughout the present description is based on the assumption that the width is the largest dimension of the image, i.e. the width is larger than the height. The case may obviously be different, e.g. by inclining the camera 90 degrees the width and the height will shift positions. Still, the solution in the general case will follow from the already disclosed description, and the effect is neutralized by merely stating that within the context of the present description the width is meant to designate the larger direction of the width and the height, irrespective of orientation.

Figure 9:
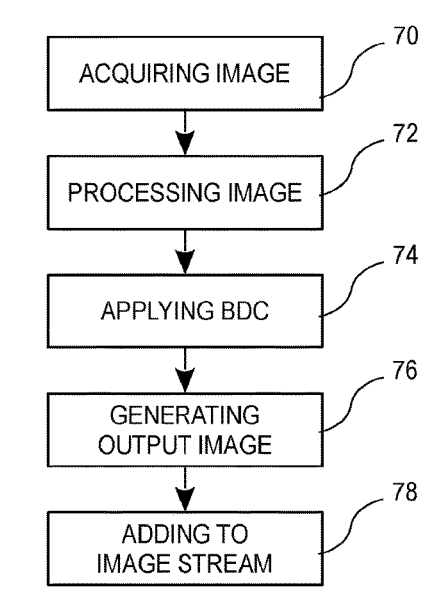
FIG. 9 is a flow chart illustrating an embodiment of the present invention.

FIG. 9 illustrates a method according to one embodiment of the present invention, summarizing specific details of the already described embodiments. In the first step 70 an image is acquired, and in a second step 72 the image data is processed within a camera. The processing may include barrel distortion correction, which in FIG. 9 is illustrated in a separate step 74. An output image is formed in step 76 and the image is added to an image stream. Forming the output image may include compressing the image according to one of many compression standards.

The method is preferably performed in a video camera, such as a digital video camera. As such the method may advantageously be performed in a surveillance camera where the enablement of a live feed of images from a scene is particularly beneficial.

The invention claimed is:

1. A method for correcting and presenting a barrel distorted image with a user-defined aspect ratio, comprising:
    acquiring a continuous flow of barrel distorted images in a video camera,
    for a barrel distorted image in the continuous flow:
        processing the image in an image processor within the video camera and adding the processed image as an output image to an image stream, wherein the processing includes
            applying a barrel-distortion correction so as enable formation of a corrected image having a minimum width and a minimum height, h', and generating the output image by cropping the corrected image to a height exceeding the minimum height and having the user-defined aspect ratio.

2. The method of claim 1, wherein areas of the output image extending beyond the minimum height are masked, such that areas not included in the interval from −h'/2 to h'/2 are masked in a coordinate system where the optical axis defines the coordinate (0,0).

3. The method of claim 1, wherein the corrected image is cropped so as to enable formation of an output image having a width smaller than or equal to the minimum width, while maintaining the user-defined aspect ratio.

4. The method of claim 1, wherein the corrected image is cropped to a width equaling the minimum width.

5. The method of claim 1, further comprising adding a user input to define format of the output image such that $w_{UI} \leq w'$, w' being the minimum width, $h_{UI} > h'$, h' being the minimum height, under the condition that the user-defined aspect ratio is maintained, where $w_{UI}$ is the width resulting from the user input and $h_{UI}$ is the height resulting from the user input.

6. The method of claim 1, wherein the barrel distortion correction is based on information concerning the zoom settings of the video camera as acquired from a controller of the video camera.

7. The method of claim 1, further comprising:

enabling the receipt of a client request including a selection between an output image displayed without barrel distortion correction or an output image corrected for barrel distortion, wherein the same user-defined aspect ratio is used for any output image.

8. An electronic device for correcting and presenting a barrel distorted image with a user-defined aspect ratio, comprising:

a camera configured to acquire a continuous flow of barrel distorted images; and processing circuitry configured to, for a barrel distorted image in the continuous flow, process the barrel distorted image and add the processed image as an output image to an image stream, wherein the processing includes applying a barrel-distortion correction so as enable formation of a corrected image having a minimum width and a minimum height, h', and generating the output image by cropping the corrected image to a height exceeding the minimum height and having the user-defined aspect ratio.

9. The electronic device of claim 8, wherein areas of the output image extending beyond the minimum height are masked, such that areas not included in the interval from −h'/2 to h'/2 are masked in a coordinate system where the optical axis defines the coordinate (0,0).

10. The electronic device of claim 8, wherein the corrected image is cropped so as to enable formation of an output image having a width smaller than or equal to the minimum width, while maintaining the user-defined aspect ratio.

11. The electronic device of claim 8, wherein the corrected image is cropped to a width equaling the minimum width.

12. The electronic device of claim 8, wherein the processing circuitry is configured to add a user input to define format of the output image such that $w_{UI} \leq w'$, w' being the minimum width, $h_{UI} > h'$, h' being the minimum height, under the condition that the user-defined aspect ratio is maintained, where $w_{UI}$ is the width resulting from the user input and $h_{UI}$ is the height resulting from the user input.

13. The electronic device of claim 8, wherein the barrel distortion correction is based on information concerning the zoom settings of the camera.

* * * * *